United States Patent [19]
Brackman

[11] 3,876,598
[45] Apr. 8, 1975

[54] PHOTODEGRADABLE POLYVINYL CHLORIDE COMPOSITIONS CONTAINING A FERROCENE PRODEGRADANT

[75] Inventor: Derek Samuel Brackman, Stanmore, England

[73] Assignee: Imperial Chemical Industries Limited, London, England

[22] Filed: May 7, 1973

[21] Appl. No.: 357,653

[30] Foreign Application Priority Data
May 18, 1972 United Kingdom............... 23343/72

[52] U.S. Cl.................260/92.8 R; 260/45.75 R; 260/DIG. 43
[51] Int. Cl. .............................................. C08f 3/22
[58] Field of Search.. 260/DIG. 43, 45.75 R, 92.8 R

[56] References Cited
UNITED STATES PATENTS
2,680,756 6/1954 Pauson............................ 260/45.75
3,269,963 8/1966 Ilgemann et al................ 260/45.75
3,676,401 7/1972 Henry................................... 260/63

FOREIGN PATENTS OR APPLICATIONS
228,938 10/1968 U.S.S.R.

OTHER PUBLICATIONS
Chemical and Engineering News, Vol. 39, Sep., 1961, p. 51.
Chemical and Engineering News, May 11, 1970,
"The Stabilization of Polyvinyl chloride," by Chevasus, St. Martens Press, Edward Arnold Publ., 1963, p. 23–27.

Primary Examiner—Eugene C. Rzucidlo
Attorney, Agent, or Firm—Cushman, Darby & Cushman

[57] ABSTRACT
Polyvinyl chloride compositions contain ferrocene or a derivative as a prodegradant.

4 Claims, No Drawings

PHOTODEGRADABLE POLYVINYL CHLORIDE COMPOSITIONS CONTAINING A FERROCENE PRODEGRADANT

This invention relates to polyvinyl chloride compositions.

The use of disposable polyvinyl chloride wrappings, containers and the like and their subsequent discarding, either intentionally or accidentally, has led to a problem of plastics litter. It is an object of this invention to alleviate this problem.

According to the invention polyvinyl chloride compositions contain a prodegradant, said prodegradant being ferrocene or a derivative of ferrocene, e.g. 0.01 to 1%, preferably 0.05 to 0.5% by weight (based on the total composition) of the prodegradant.

In addition to the parent compound, i.e. ferrocene, alkyl and cycloalkyl derivatives as well as keto and ester derivatives have been found particularly useful. The alkyl and cycloalkyl ferrocenes are those in which the or each alkyl or cycloalkyl group contains from 1 to 18, preferably 4 to 5, carbon atoms. The keto ferrocenes are those in which the or each substituent takes the form of a hydrocarbon group having up to 11 carbon atoms joined to the ferrocene nucleus via a CO- group.

The invention includes wrappings (e.g. wrapping film) and containers made of the polyvinyl chloride compositions described above. The following are examples of containers: bags, sacks, boxes, cartons, bottles, sachets, cups and thermoforms.

As used in this specification the term "polyvinyl chloride" denotes not only the homopolymers of vinyl chloride but also its copolymers which contain more than 50% by weight of vinyl chloride monomers. The following are examples of monomers which can be copolymerised with vinyl chloride: vinyl esters such as vinyl acetate and vinyl stearate; vinylidene chloride; vinyl ethers such as isobutyl vinyl ether; alkyl acrylates and methacrylates such as ethyl acrylate, butyl acrylate, 2-ethyl hexyl acrylate, and methyl methacrylate; olefines such as ethylene, propylene, 4-methyl pentene-1, dodecene-1 and tetradecene.

We have found that ferrocene and its derivatives increase the rate of degradation of polyvinyl chloride compositions which contain conventional additives such as stabilisers, lubricants, dyes, pigments, impact modifiers, processing aids, fillers and blowing agents.

Several embodiments of the invention will now be described by way of example.

Seven prodegradants were used in accordance with the invention to prepare polyvinyl chloride compositions. In each case the prodegradant was added to a basic blend which consisted of:

| | |
|---|---|
| polyvinyl chloride | 100 parts by weight |
| heat stabiliser | 2 parts by weight |
| stearic acid | 0.25 parts by weight | the heat stabiliser was dibutyl tin dinonyl thioglycolate.

The seven prodegradants used were:

Parent Compound

| Prodegradant 1 | Ferrocene |
|---|---|

Alkyl Derivatives

| Prodegradant | Substituent | No. of substituents |
|---|---|---|
| 2 | cyclopentyl | 1 |

Keto Derivatives

| Prodegradant | Group connected to CO | No. of substituents |
|---|---|---|
| 3 | methyl | 2 |
| 4 | t-butyl | 1 |
| 5 | t-butyl | 2 |
| 6 | phenyl | 2 |
| 7 | undecyl | 1 |

Other Derivatives

| Prodegradant | Substituent | No. of substituents |
|---|---|---|
| 8 | —COO.C$_2$H$_5$ | 1 |

The compositions were prepared by mixing each prodegradant with the basic blend to give mixtures which contained 0.1% by weight of prodegradant as stated in Table 1. These mixtures were gelled on a mill at 160°C for 10 minutes. The crepe was compression moulded using 5 minutes pre-heat at 175°C and 3 minutes under 20 tons per square inch pressure to give film 0.007 to 0.010 inch thick when rapidly cooled to 25°C.

Samples 1 cm × 3 cm were cut from the pressed sheet and subjected to U.V. irradiation using modified FS/BL irradiation (i.e. a combination of a fluorescent sun lamp, a Philips actinic blue and two natural daylight fluorescent lamps). The samples were maintained at a distance of 10 cms from the lamps.

The samples were inspected and tested for flex-crack failure at intervals of 8 to 12 hours until cracking occurred when subjected to bending stress. This cracking was taken as evidence of embrittlement. The times (in hours) required are given in Table 1.

In addition some of the compositions were exposed out of doors in South Africa and times (in weeks) required for the composition to become embrittled are also recorded in Table 1. The procedure was as follows.

Specimens of foil were mounted between 'Perspex' (RTM) sheets with a circle 2 cm in diameter uncovered and these were exposed at 45° to the horizontal facing north in South Africa commencing in February 1972. The specimens were tested for embrittlement at weekly intervals by dropping a 3.8 g mass in the form of a 7.5 mm diameter rod onto the unexposed face of the horizontal specimen. The mass was dropped from a height of 310 mm down a vertical guide tube. Repeats with the same formulations gave identical embrittlement times.

The basic blend without any additive was also exposed and the times required for this composition are recorded in Table 1 as blanks.

TABLE 1

| Code No. | Prodegradant No. of Substituents | Prodegradant C's per Substituent | Conc % weight | Time to Embrittle Indoors (hours) | Time to Embrittle Out of doors (weeks) Feb. 1972 |
|---|---|---|---|---|---|
| Parent | | | | | |
| 1 | 0 | — | 0.1 | 560 | 4 & 4½ |
| Alkyl | | | | | |
| 2 | 1 | 5 | 0.1 | 656 | 8½ |
| Keto | | | | | |
| 3 | 2 | 2 | 0.1 | 605 | — |
| 4 | 1 | 5 | 0.1 | 770 | — |
| 5 | 2 | 5 | 0.1 | 656 | 3 |
| 6 | 2 | 7 | 0.1 | 777 | — |
| 7 | 2 | 12 | 0.1 | 605 | — |
| Other | | | | | |
| 8 | 1 | 3 | 0.1 | 770 | 4 |
| BLANKS | — | — | none | 960 | >11 |

I claim:

1. Polyvinyl chloride compositions which contain 0.01 to 1% by weight, based on the total composition, of a prodegradant, said prodegradant being selected from the group consisting of ferrocene, ferrocene substituted with at least one alkyl group containing 1 to 18 carbon atoms and ketoferrocene having at least one alkyl group with 1 to 11 carbon atoms joined to the ferrocene nucleus via a CO-group.

2. Polyvinyl chloride compositions which contain 0.05 to 0.5% by weight based on the total composition of the prodegradant.

3. A container made of a polyvinyl chloride composition according to claim 1.

4. Wrapping material made of a polyvinyl chloride composition according to claim 1.

* * * * *

Notice of Adverse Decision in Interference

In Interference No. 99,356, involving Patent No. 3,876,598, D. S. Brackman, PHOTODEGRADABLE POLYVINYL CHLORIDE COMPOSITIONS CONTAINING A FERROCENE PRODEGRADANT, final judgment adverse to the patentee was rendered Dec. 23, 1976, as to claims 1 and 2.

[*Official Gazette March 22, 1977.*]